United States Patent [19]

Kraus

[11] Patent Number: 4,620,455
[45] Date of Patent: Nov. 4, 1986

[54] TRACTION ROLLER TRANSMISSION

[75] Inventor: Charles E. Kraus, Austin, Tex.
[73] Assignee: Excelermatic Inc., Austin, Tex.
[21] Appl. No.: 699,835
[22] Filed: Feb. 8, 1985
[51] Int. Cl.[4] .............. F16H 13/06; F16H 13/00; F16H 13/02
[52] U.S. Cl. ........................ 74/798; 74/206; 74/208; 74/209
[58] Field of Search ............... 74/798, 796, 209, 208, 74/206, 690

[56] References Cited

U.S. PATENT DOCUMENTS

| 771,541 | 10/1904 | Ericson | 74/208 |
|---|---|---|---|
| 1,737,997 | 12/1929 | Garrard | 74/798 |
| 3,516,305 | 6/1970 | Chery | 74/796 |
| 3,530,732 | 9/1970 | Kashihara | 74/796 X |
| 3,610,060 | 10/1971 | Hewko | 74/208 |
| 3,941,004 | 3/1976 | Kraus | 74/206 |
| 3,945,270 | 3/1976 | Nelson et al. | 74/798 |
| 4,052,915 | 10/1977 | Kraus | 74/209 X |
| 4,296,648 | 10/1981 | Okano et al. | 74/798 |
| 4,435,998 | 3/1984 | Kinoshita | 74/798 |

FOREIGN PATENT DOCUMENTS

| 1090515 | 10/1960 | Fed. Rep. of Germany | 74/798 |
|---|---|---|---|
| 838192 | 6/1981 | U.S.S.R. | 74/798 |

Primary Examiner—Kenneth J. Dorner
Assistant Examiner—Stephen B. Andrews

[57] ABSTRACT

A traction roller transmission having a number of planetary type rollers disposed in an annular spaced formed between a sun roller rotatable with one shaft and a traction ring surrounding the sun roller. The traction ring, the planetary rollers and the sun roller all have annular projections and recesses with inclined hard metallic lubricated side surfaces by which the planetary rollers are in engagement with the sun roller and the traction ring for the transmission of motion therebetween. Preferably, means are provided for forcing planetary rollers into engagement with the traction ring and the sun roller with forces which depend on the torque transmitted through the transmission.

6 Claims, 5 Drawing Figures

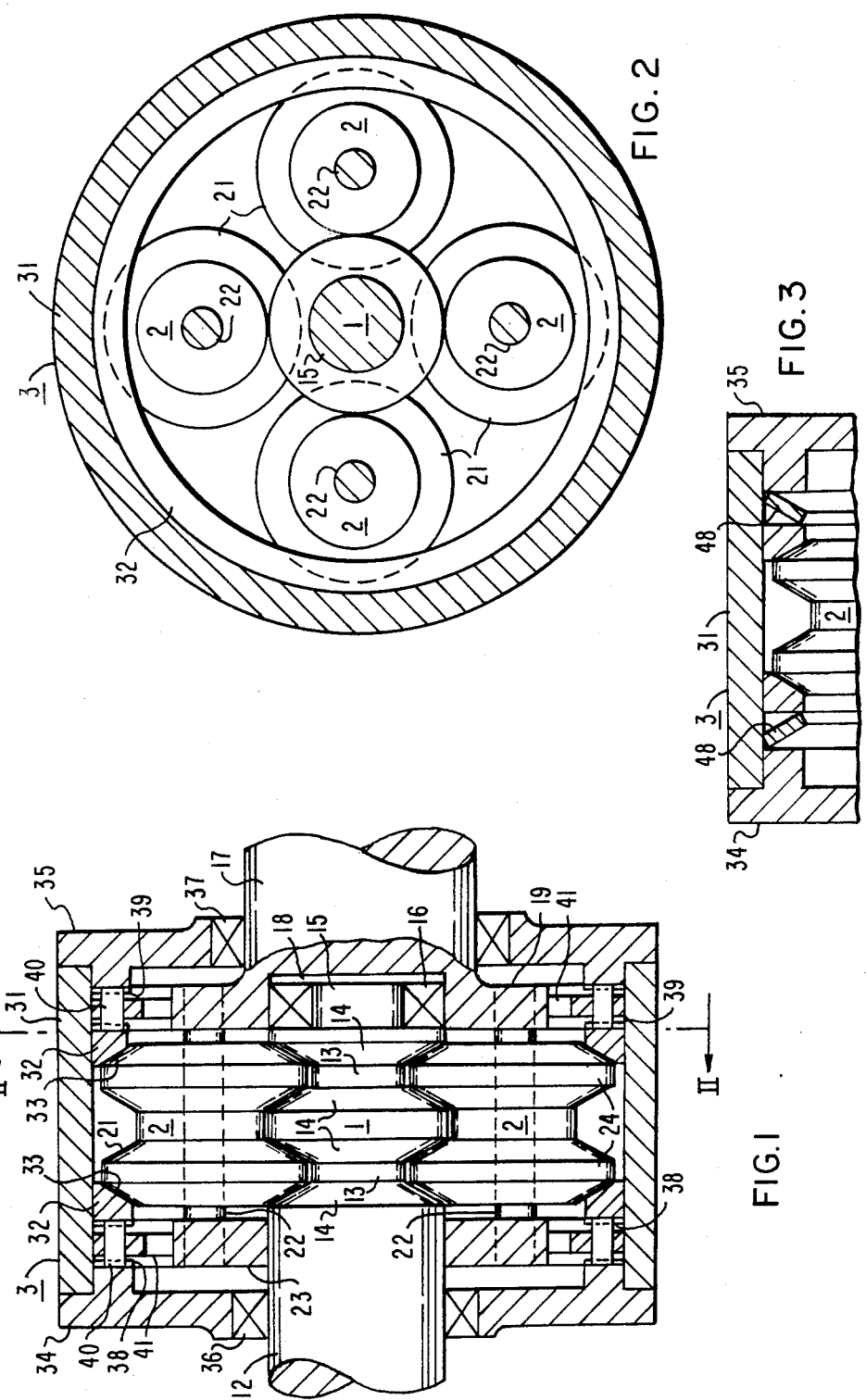

TRACTION ROLLER TRANSMISSION

BACKGROUND OF THE INVENTION

The invention relates to fixed ratio traction roller transmissions with traction rollers having lubricated hard metal contact surface areas in firm engagement with one another for the transmission of motion.

Such traction roller transmissions generally utilize large contact forces in order to prevent slippage of the rollers. Various traction or friction roller transmissions are described by Harold A. Rothbart in the "Mechanical Design and Systems" Handbook, pages 14-8 and 14-9, McGraw-Hill, New York, 1964. In the relatively simple arrangements of FIGS. 14.6 and 14.7 wherein the outer rings are slightly undersized to compress the roller arrangements, the surface pressure on the traction surfaces is always the same, that is, it is always at maximum independently of the torque transmitted through the transmission. Also, various transmission arrangements are known in which the contact pressure of the traction surfaces is dependent on the size of the torque transmitted through the transmission as, for example, in those shown on page 14-8 of said handbook.

In the arrangement according to U.S. Pat. No. 771,541, variable compressive forces are obtained by an outer ring structure so arranged that the ring is compressed at a rate depending on the torque transmitted through the transmission.

However, the arrangement requires sliding surface areas which are difficult to manufacture and unreliable in use or it requires complicated lever arrangements which amplify the reaction forces of the transmission to provide sufficient compression of the outer ring for its engagement with the traction rollers.

U.S. Pat. No. 3,610,060 shows a friction drive in which the sun roller consists of two slightly conical sections adapted to be forced toward one another when a torque is transmitted through the drive in order to provide firm engagement of the barrel-shaped planetary rollers with the sun roller and the traction ring surrounding the planetary rollers. However, the differences in curvature between the small sun roller and planetary rollers is quite large so that if the cone angle were large, substantial spin would take place which would result in wear and friction losses. On one hand, this transmission requires a relatively large cone angle of the conical sun roller faces in order to avoid their locking and, on the other hand, it requires relatively long lines of contact between the sun roller sections and the planetary rollers in order to avoid overly large surface pressures which are very localized as a result of the large curvature differences between the sun roller and planetary roller traction surfaces. As a result, such a transmission would be usable only for small power transmission requirements.

SUMMARY OF THE INVENTION

In a traction roller transmission having a number of planetary type rollers disposed in an annular space formed between a sun roller and a traction ring surrounding the sun roller, the traction ring, the planetary rollers and the sun roller have a plurality of annular projections and recesses with inclined lubricated hard metallic side surfaces by which the planetary traction rollers are in engagement with the sun roller and the traction ring for the transmission of motion therebetween. Means are provided for forcing the planetary rollers into engagement with the sun roller and the traction ring, preferably with a force which is dependent on the torque transmitted through the transmission.

Fixed ratio traction drives with hard metal contact surfaces exposed to a traction fluid can usually not successfully operate with high ratio shear in the contact areas because of the high contact pressures involved. Although cylindrical rollers are capable of transmitting considerable amounts of power per pound of weight, there are applications where even greater weight savings are desired while cost is of no great concern, such as aircraft turbine speed reduction gearing, space applications, etc. The deflection of the hard steel in the contact areas is very small and the necessary manufacturing accuracy and, consequently, manufacturing cost, would be quite high. In fact, a computer analysis of such a V-drive has revealed that the contact length even for fairly large rollers must not exceed 0.1 inch and 0.05 inch for small sun rollers in planetary configurations, that is, the length of the contact area should not be larger than 0.03 inch per inch of radial length of a sun roller, that is, $1 \leq 0.015$ d wherein l is the radial contact length and d is the roller diameter. However, the required accuracies can in fact be achieved by modern crush grinding.

BRIEF DESCRIPTION OF THE DRAWINGS

FIGS. 1 and 2 show, schematically, planetary traction roller drive arrangements with torque dependent engagement means, FIG. 2 being taken along line II—II of FIG. 1;

FIG. 3 shows a section of a drive as in FIG. 1 but with predetermined force engagement means.

DESCRIPTION OF PREFERRED EMBODIMENTS

Figure 5:
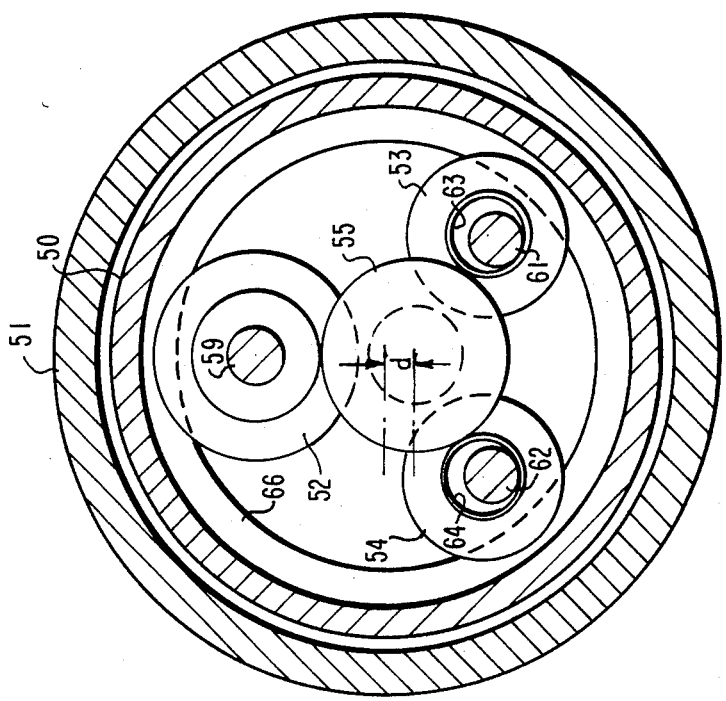
FIGS. 4 and 5 show another embodiment with a different roller and ring engagement means, FIG. 5 being taken along line IV—IV of FIG. 4.

The traction roller transmission as shown in FIGS. 1 and 2 includes basically a sun roller 1 centrally disposed within a traction ring assembly 3 and traction rollers 2 arranged in the annular space between the sun roller 1 and the traction ring assembly 3.

As shown in FIG. 1, the sun roller 1 is formed at the end of an input shaft 12 which has spaced circumferential V-grooves 13 with hard metal side faces 14 having a predetermined angle with respect to a plane normal to the axis of the input shaft 12. At its inner end the input shaft 12 has a trunnion 15 on which it is supported by a bearing 16. The traction ring assembly 3 consists of a housing ring 31 which carries two traction rings 32 having side surfaces 33 disposed, with respect to said plane normal to the axis of the input shaft 12, at the same predetermined angle as the side surfaces 14 of the sun roller 1. The housing ring 31 is mounted on housing side walls 34 and 35. The input shaft 12 extends through the side wall 34 and is preferably supported therein by an input shaft bearing 36. An output shaft 17 is rotatably supported in the housing side wall 35 by a bearing 37 and is provided with a central bore 18 receiving the trunnion 15 of the input shaft 12 and is supported therein by the bearing 16. The output shaft 17 is provided with a flange 19 carrying planetary traction roller assemblies 2. The traction roller assemblies 2 include grooved planetary rollers 21 which are rotatably supported on shafts 22 extending between the output shaft flange 19 disposed at one side of the planetary rollers 21 and a support ring 23 disposed at the other side of the planetary rollers 21. The planetary rollers 21 have circumferential annular projections 24 shaped so as to fit into the grooves 13 of the sun roller 1 for engagement of the side faces 14 with the side faces of the annular projection 24 of the planetary rollers 2.

The traction rings 32 of the traction ring assembly 3 have, opposite their side surfaces 33, annular axial cam areas 38 and the housing side plates 34 and 35 have annular axial cam projections 39 with bearing rollers 40 disposed between the cam areas 38 and the cam projections 39, and held in position by annular cages 41 which are disposed between the cam structures 38 and 39 and have circumferentially spaced openings receiving the rollers 40. In order to provide for a torque dependent engagement force, the traction rings 32 are circumferentially movable to a certain degree by the reaction torque of the planetary rollers 2 until they are forced into firm engagement with the planetary rollers 2 by the cam structures 38, 39. As a result, a section of the planetary roller side surfaces is engaged between the traction rings 32 with an engagement force which depends on the torque transmitted through the transmission. At the same time, the planetary rollers 2 are forced radially inwardly into firm engagement with the sun roller 1.

A transmission with hard surface contact areas operating in traction fluid does not normally last very long if there is high shear in the contact areas as is the case in such groove-type arrangements. Such a transmission is, however, relatively light for the amount of power it is able to transmit. It has further been found that the required part accuracy and manufacturing costs, though quite high, would be justified where weight savings are extremely important, such as in aircraft turbine reduction gearing or space applications.

The necessary surface smoothness and accuracy of groove grinding is achievable by modern crush grinding. The appended computer printout gives the data for a first stage turbine speed reduction drive with three planetary rollers. However, any other number of rollers can be used as far as they can be accommodated. Four planetary traction rollers are used in the arrangement as shown in FIGS. 1 and 2.

As further shown in FIGS. 1 and 2, there are for each planetary roller only two contact areas with traction rings 32, four with the sun roller 1. It is noted that this is advantageous since the curvature difference between the traction rings 32 and the planetary rollers is substantially smaller than between the sun roller and the planetary rollers. The surface pressures between the traction rings and sun roller are then of similar size and undesired slipping or otherwise overloading of the sun roller surfaces can be avoided.

FIG. 3 shows schematically an arrangement wherein, instead of a cam structure as shown at 40 in FIG. 1, Belleville-type spring rings 48 are provided. These are simpler and lighter than cam structures but provide only predetermined engagement forces.

Figure 4:
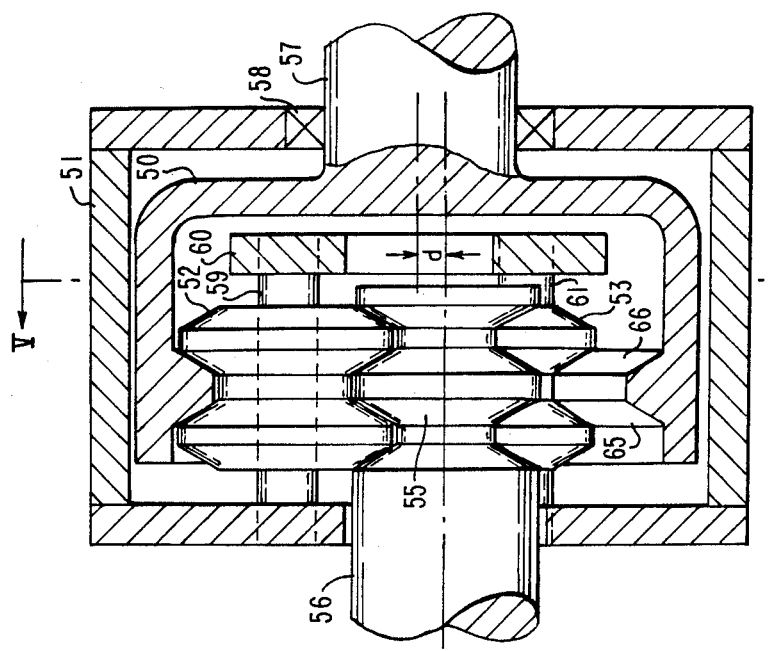

FIG. 4 shows a planetary traction roller transmission with grooved sun and planetary rollers in accordance with the present invention, wherein, however, the engagement forces are generated in principle as in the arrangement of applicant's earlier U.S. Pat. No. 3,941,004. In this arrangement, a traction ring 50 disposed in a housing 51 surrounds three traction rollers 52, 53, 54 engaging therebetween a sun roller 55 for the transmission of power between the sun roller 55 and the traction ring 50. The sun roller 55 is part of an input shaft 56 and the traction ring is mounted on an output shaft 57 which is supported in the housing 51 by a bearing 58. The axes of the sun roller 55 and the traction ring 50 are parallel to, but spaced from, one another by a distance d so that, between the traction ring 50 and the sun roller 55, an annular path of varying width is formed. The roller 52 is disposed in the widest path area and the rollers 53 and 54 are disposed in the narrowing path areas. The roller 52 is rotatably supported on a shaft 59 which extends between the housing 51 and a support ring 60. Both rollers 53 and 54 are free to move into the narrowing path but their movement out of the narrowing path is restricted by abutments provided, for example, by shafts 61, 62 extending between the housing 51 and the support ring 60 and through oversized openings 63, 64 in the rollers 53 and 54 and so arranged as to be abutted by the rollers when the rollers move in a direction out of the narrowing gaps. Such an arrangement forces all the planetary rollers into firm engagement with the sun roller and the traction ring when a torque is transmitted through the transmission.

With the arrangement according to the invention the radial forces need not be large, that is, they may be substantially smaller than with cylindrical rollers since the radial forces are amplified as contact forces for the inclined side faces. Accordingly, the bearing forces are smaller and the bearings may be smaller and lighter. The amplified contact forces on the metallic side faces of the roller grooves on the other hand need not be transmitted through various parts but are compensated for by other forces applied to the same part. For example, the axial component of an engagement force applied to one side surface 65 of an annular projection is compensated by the axial component of an engagement force applied to the adjacent side surface 66 of the same annular projection so that only the radial forces have to be taken up by the housing, that is, by the traction ring. Such a transmission therefore has relatively little weight with high power transmission capabilities.

I claim:

1. A planetary type traction roller transmission comprising a traction ring structure having traction rings with opposite conically inclined side surfaces, a sun roller centrally disposed within the traction ring structure and having at least two annular grooves with inclined side faces forming hard lubricated traction race surfaces with a diameter smaller than said traction ring structure so as to form an annular space therebetween, planetary traction rollers supported in the space between the sun roller and the traction ring structure and having at least two annular projections with inclined inner and outer surfaces extending into the grooves of said sun roller so as to be engaged by the side surfaces thereof, said traction ring structure including traction rings arranged at opposite sides of said planetary rollers and having conical side faces adjacent the outer inclined side surfaces of said planetary rollers and means for forcing said traction rings toward one another so as to cause firm engagement of the conical surface thereof with the outer of said inclined side surfaces of the planetary rollers during operation of the transmission, with said planetary traction rollers having fewer of their traction side surfaces engaged with said traction ring than with said sun roller.

2. A transmission as claimed in claim 1, wherein said means for forcing the traction rings toward one another is an axial cam structure formed adjacent said traction rings so as to provide reaction torque dependent engagement means.

3. A transmission as claimed in claim 1, wherein said means forcing said traction rings toward one another are Belleville-type spring rings.

4. A traction roller transmission as claimed in claim 1, wherein the radial contact length of the inclined surfaces of said sun roller and said planetary traction rollers is not larger than 0.015 times the diameter of the smallest one of said sun roller and said planetary traction rollers.

5. A traction roller transmission having input and output shafts, a hard metallic traction ring carried by one of said shafts for rotation therewith, a hard metallic sun roller carried by the other of said shafts, said sun roller being arranged within said traction ring with its axis parallel to, but displaced from, the axis of said traction ring thereby to form an annular path of varying width between the sun roller and said traction ring and a number of hard metallic motion transmitting planetary traction rollers disposed in said annular space in annularly spaced relationship, at least one of said planetary traction rollers being so supported as to be free to be moved into a narrowing section of said annular path to cause firm engagement of said planetary rollers with said sun rollers and said traction ring, said sun roller, said planetary rollers and said traction ring each having alternate annular projections and means with inclined side surfaces, at least some of the projections of said planetary rollers extending into the recesses in said sun roller and in said traction ring such that said inclined side faces are in power transmitting engagement with one another when a torque is transmitted through said transmission, with said planetary traction rollers having fewer of their traction side surfaces engaged with said traction ring than with said sun roller.

6. A traction roller transmission as claimed in claim 5, wherein the radial contact length of the inclined surfaces of said sun roller and said planetary traction rollers is not larger than 0.015 times the diameter of the smallest one of said sun roller and said planetary traction rollers.

* * * * *